United States Patent
Kapoor et al.

(10) Patent No.: US 12,073,329 B2
(45) Date of Patent: Aug. 27, 2024

(54) METHOD FOR RECOGNIZING AN ADVERSARIAL DISTURBANCE IN INPUT DATA OF A NEURAL NETWORK

(71) Applicant: VOLKSWAGEN AKTIENGESELLSCHAFT, Wolfsburg (DE)

(72) Inventors: Nikhil Kapoor, Wolfsburg (DE); Peter Schlicht, Wolfsburg (DE); John Serin Varghese, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 727 days.

(21) Appl. No.: 16/986,556

(22) Filed: Aug. 6, 2020

(65) Prior Publication Data

US 2021/0042627 A1  Feb. 11, 2021

(30) Foreign Application Priority Data

Aug. 9, 2019  (DE) ...................... 10 2019 212 020.2

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 2018/0308012 A1 | 10/2018 | Mummadi et al. | |
| 2020/0151503 A1* | 5/2020 | Wang | G06F 18/2413 |
| 2020/0353943 A1* | 11/2020 | Siddiqui | G08G 1/0129 |

FOREIGN PATENT DOCUMENTS

| | | |
|---|---|---|
| DE | 19649618 A1 | 6/1998 |
| DE | 102018200724 A1 | 10/2018 |
| WO | 2018085697 A1 | 5/2018 |

OTHER PUBLICATIONS

Title—A cGANs-based scene reconstruction model using Author—Zhenchao Ouyang, Yu Liu, Changjie Zhang, Jianwei Niu Publisher—IEEE Published Date—2017 (Year: 2017).*

(Continued)

*Primary Examiner* — Kakali Chaki
*Assistant Examiner* — Michael H Hoang
(74) *Attorney, Agent, or Firm* — Barnes & Thornburg LLP

(57) ABSTRACT

A method for detecting an adversarial perturbation in input data of a neural network, wherein a conditional generative adversarial network is trained during a training phase, wherein a generator network of the conditional generative adversarial network is trained to generate adversarial perturbations conditioned on input data of the neural network, and wherein a discriminator network of the conditional generative adversarial network is trained at least to detect an adversarial perturbation in the input data generated by the generator network, and wherein, during an application phase, the trained discriminator network detects an adversarial perturbation in input data of the neural network and provides a detection result. Also disclosed is a backend server, a detection device and a system.

23 Claims, 2 Drawing Sheets

(56) References Cited

OTHER PUBLICATIONS

Liu X, Hsieh CJ. Rob-GAN: Generator, Discriminator, and Adversarial Attacker. arXiv preprint arXiv:1807.10454. Jul. 27, 2018. https://arxiv.org/pdf/1807.10454.pdf (Year: 2019).*

Wu, Xi, et al. "Reinforcing adversarial robustness using model confidence induced by adversarial training." International conference on machine learning. PMLR, 2018. https://proceedings.mlr.press/v80/wu18e/wu18e.pdf (Year: 2018).*

Liu et al.; Implementing a Cloud Platform for Autonomous Driving; Apr. 10, 2017; downloaded from https://arxiv.org/ftp/arxiv/papers/1704/1704.02696.pdf.

Metzen et al.; On Detecting Adversarial Perturbations; Feb. 21, 2017; downloaded from https://arxiv.org/abs/1702.04267.

Santhanam et al.; Defending Against Adversarial Attacks by Leveraging an Entire Gan; Arxiv.org; Cornell University Library; May 27, 2018.

Goodfellow et al.; Generative Adversarial Nets; Advances in Neural Information Processing Systems 27 (NIPS 2014); pp. 2672-2680.

Grimm et al.; Modeling Latent Attention Within Neural Networks; ICLR; Dec. 30, 2017.

Luo et al.; Towards Imperceptible and Robust Adversarial Example Attacks against Neural Networks; Association for the Advancement of Artificial Intelligence 32nd Conference; Jan. 15, 2018.

Mizra et al.; Conditional Generative Adversarial Nets; arXiv:1411.1784v1; Nov. 6, 2014.

Vatanparvar et al.; Self-Secured Control with Anomaly Detection and Recovery in Automotive Cyber-Physical Systems; Design, Automation and Test in Europe Conference and Exhibition; IEEE; 2019.

Weng et al.; Evaluating the Robustness of Neural Networks: An Extreme Value Theory Approach; arXiv.1801.10578v1; Jan. 31, 2018.

Xiao et al.; Generating Adversarial Examples with Adversarial Networks; arXiv preprint arXiv:1801.02610 (2018).

* cited by examiner

METHOD FOR RECOGNIZING AN ADVERSARIAL DISTURBANCE IN INPUT DATA OF A NEURAL NETWORK

PRIORITY CLAIM

This patent application claims priority to German Patent Application No. 10 2019 212 020.2, filed 9 Aug. 2019, the disclosure of which is incorporated herein by reference in its entirety.

SUMMARY

Illustrative embodiments relate to a method for detecting an adversarial perturbation in input data of a neural network. Illustrative embodiments further relate to a backend server, a detection device, a system and a transportation vehicle.

BRIEF DESCRIPTION OF THE DRAWINGS

The disclosed embodiments are explained in detail below with reference to the figures, wherein.

DETAILED DESCRIPTION

Figure 1:
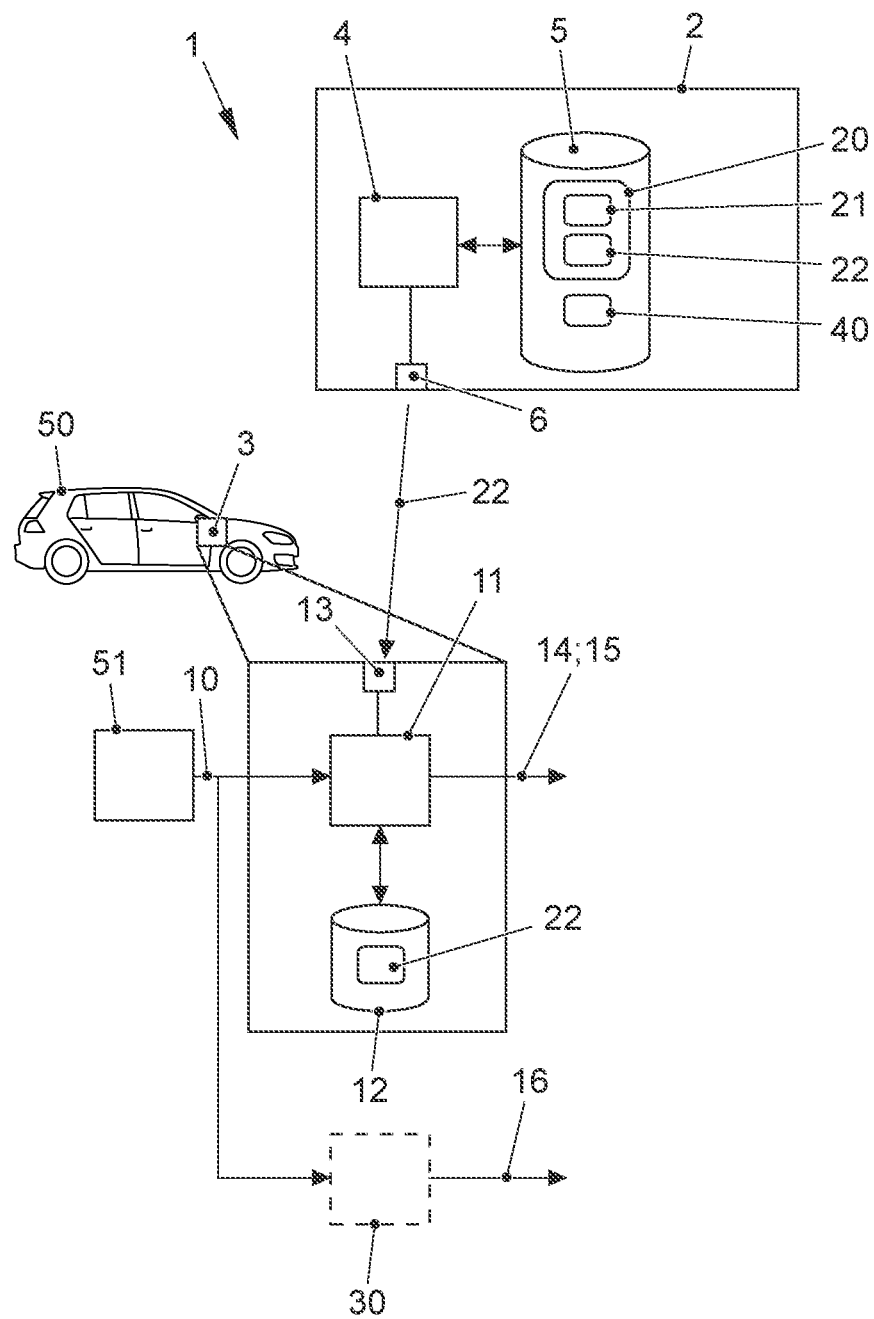
FIG. 1 shows a schematic view of exemplary embodiments of the backend server and the detection device.

Machine learning, for example, based on neural networks, offers great potential for an application in modern driver assistance systems and automated-driving transportation vehicles. Functions based on deep neural networks process sensor data here (for example, from cameras, radar sensors or lidar sensors) to derive relevant information therefrom. This information comprises, for example, a type and a position of objects in an environment of the transportation vehicle, a behavior of the objects or a road geometry or road topology.

Among the neural networks, convolutional neural networks (CNN) have proven to be particularly suitable for image processing applications. Convolutional networks extract different high-quality features from input data (e.g., image data) gradually and in unmonitored form. Here, during a training phase, the convolutional network independently develops feature maps based on filter channels which locally process the input data to hereby derive local characteristics. These feature maps are then reprocessed by further filter channels which derive higher-quality feature maps therefrom. Finally, the deep neural network derives its decision on the basis of this information consolidated in this way from the input data and provides the decision as output data.

Although convolutional networks outperform conventional approaches in terms of functional precision, they nevertheless also have drawbacks. Attacks based on adversarial perturbations in the sensor data/input data, for example, can thus result in a misclassification or incorrect semantic segmentation in the captured sensor data despite a semantically unchanged content.

Generative adversarial networks are known from I. Goodfellow et al., "Generative Adversarial Nets", Advances in Neural Information Processing Systems 27 (NIPS 2014), pp. 2672-2680, Curran Associates Inc., 2014. Conditional generative adversarial networks are known from M. Mirza and S. Osindero, "Conditional Generative Adversarial Nets", (arXiv:1411.1784v1 [cs.LG] 6 Nov. 2014).

The disclosed embodiments provide a method for detecting an adversarial perturbation in input data of a deep, neural network. Disclosed embodiments also provide associated devices to carry out the method.

The is achieved by methods, a backend server, a detection device and a system.

A method is provided for detecting an adversarial perturbation in input data of a neural network, wherein a conditional generative adversarial network is or has been trained during a training phase, wherein a generator network of the conditional generative adversarial network is or has been trained here to generate adversarial perturbations conditioned on input data of the neural network, and wherein a discriminator network of the conditional generative adversarial network is or has been trained at least to detect an adversarial perturbation in the input data generated by the generator network, and wherein, during an application phase, the trained discriminator network is used to detect an adversarial perturbation in input data of the neural network and to provide a detection result.

A backend server is further provided, comprising a computing device and a storage device, wherein the computing device is designed in such a way as to provide and train a conditional generative adversarial network during a training phase, wherein a generator network of the conditional generative adversarial network is trained here to generate adversarial perturbations conditioned on input data of the neural network, and further to train a discriminator network of the conditional generative adversarial network at least to detect an adversarial perturbation in the input data generated by the generator network, and to provide the trained discriminator network.

A detection device for detecting adversarial perturbations in input data of a neural network is further provided, comprising a computing device and a storage device, wherein the computing device is designed in such a way as to provide a discriminator network trained using the disclosed method, and to detect herewith an adversarial perturbation in input data of the neural network and to provide a detection result.

The method enables adversarial perturbations in input data of the neural network to be detected over a large continuum of options of the adversarial perturbations. The detection is performed by a trained discriminator network of a conditional generative adversarial network. The conditional generative adversarial network is trained to provide the discriminator network. The conditional generative adversarial network comprises two components: a generator network and the discriminator network. The basic concept behind a (conditional) generative adversarial network is that the generator network and the discriminator network are allowed to compete with one another during a training phase. The generator network is trained during the training phase to generate adversarially perturbed input data for the neural network based on known adversarial perturbations. The generator network is conditioned here on specific input data so that a conditional generative adversarial network is provided. This conditioning maps known adversarial perturbations here, in particular, for the type of input data, so that the generator network can reproduce patterns of these adversarial perturbations in generated input data after the training phase. Both adversarially perturbed input data and unperturbed input data are fed to the generator network. The discriminator network is trained during the training phase to detect whether the input data fed to the discriminator network are or are not adversarially perturbed. It can also be provided that it is also additionally intended to be detected whether the input data have an adversarial perturbation generated by the generator network or an original adversarial perturbation, i.e., corresponding to an adversarial perturbation originally present in the training dataset of the generator network. Increasing training and "rivalry" between the generator network and the discriminator network result in an improvement not only in the generator network, i.e., the generator network generates adversarial perturbations which are increasingly difficult to detect in the generated input data, but also in the discriminator network, i.e., the discriminator network becomes increasingly proficient in detecting adversarial perturbations in the input data generated by the generator network. Following the training phase, a state of equilibrium is ideally attained in which the discriminator network correctly classifies adversarially perturbed input data provided by the generator network with a probability of 50%. In an application phase following the training phase, only the trained discriminator network is then used. The trained discriminator network is used in the application phase to detect an adversarial perturbation in input data of the deep, neural network and to provide a detection result. Current input data, for example, currently captured sensor data, are fed to the trained discriminator network for this purpose. The detection result comprises a statement or estimation concerning whether the input data are or are not adversarially perturbed.

The disclosed embodiments offer the benefit that a range of adversarial perturbations which can be detected in the input data of the neural network can be increased. The generated input data have a broader range of options, since not only individual representatives of known adversarial perturbations, but also a broad continuum of known adversarial perturbations can be generated or mapped. Consequently, the discriminator network is also trained for this continuum, so that the detection of adversarial perturbations in the input data of the neural network is improved.

A further benefit of the method is that computing power can be reduced, since the discriminator network is trained on a backend server and can subsequently be provided in the trained state by a detection device designed, for example, as an embedded system with a lower computing power.

A neural network is a deep neural network, in particular, a convolutional neural network (CNN). The neural network is or has been trained for a specific function, for example, for recognizing pedestrians or other objects in captured camera images. The disclosed embodiments are independent from the actual design of the neural network. According to the disclosure, the input data, in particular, the sensor data from at least one sensor fed as input data to the neural network, are intended to be monitored and adversarial perturbations contained therein are intended to be detected. Output data generated or inferred by the neural network are then further processed and are fed for this purpose to a further device, for example, a control device or a control unit, in particular, of a transportation vehicle. The further device can also be part of the detection device, for example, as a processing device comprising the detection device and the neural network. The output data can be used there, for example, for decision-making in the automated or partially automated driving of a transportation vehicle, in particular, for trajectory planning or maneuver planning and/or for controlling an actuator system of the transportation vehicle. It is provided that the detection result, for example, as a detection result signal, is also taken into account in the further processing. The detection result, for example, as the detection result signal, is fed to the control device or control unit so that the latter can take the detection result into account in the further processing. In principle, the neural network and the method can also be used in other application scenarios, for example, in process monitoring and/or process control in industrial production, etc.

The input data of the neural network can be one-dimensional or multi-dimensional. The input data are sensor data from at least one sensor. The input data are currently captured sensor data from at least one sensor which are captured during the application phase. The input data are, for example, two-dimensional data, in particular, image data captured by a camera.

A sensor is a camera, a lidar sensor, an ultrasound sensor, a radar sensor or other sensor which monitors, for example, an environment, in particular, an environment of the transportation vehicle.

A transportation vehicle is, in particular, a motor vehicle, an electric vehicle or a hybrid vehicle. In principle, however, a transportation vehicle can also be a different land vehicle, rail vehicle, aircraft, spacecraft or watercraft.

An adversarial perturbation is, in particular, a specifically performed perturbation of the input data of a neural network in which a semantic content in the input data is not changed, but the perturbation causes the neural network to infer an incorrect result, i.e., to perform a misclassification or incorrect segmentation of the input data.

A generative adversarial network is, in particular, a method for generating or training neural networks in which two neural networks, referred to as the generator network and the discriminator network, compete with one another during a training phase and are trained as a result.

A conditional generative adversarial network is, in particular, a generative adversarial network which is or has been trained to reproduce patterns which are present in training data in generated data, i.e., according to the disclosure, the input data of the neural network. If the input data are image data, the conditional generative adversarial network can provide unperturbed image data with adversarial perturbations (acquired during the training phase).

It can be provided that at least the application phase is repeated cyclically in each case for input data which are currently provided and fed to the discriminator network. A continuous checking of the input data of the neural network is enabled as a result.

The computing devices of the backend server and/or the detection device can be designed as a combination of hardware and software, for example, as program code which is executed on a microcontroller or microprocessor.

In at least one exemplary embodiment, it is provided that the neural network provides a function for the automated driving of a transportation vehicle and/or for a driver assistance of the transportation vehicle and/or for an environment monitoring and/or environment recognition. The neural network can, for example, provide an object detection and/or object classification and/or object position detection (e.g., "bounding boxes") and/or a semantic segmentation. However, it can also be provided that output data generated by the neural network are control data for an actuator system of the transportation vehicle.

In at least one exemplary embodiment, it is provided that sensor data from at least one sensor captured during the application phase are fed as input data to the neural network and output data are generated and provided by the neural network on the basis of the input data, wherein the sensor data from the at least one sensor are captured during the application phase. This means that the input data are or comprise captured sensor data from at least one sensor. As a result, the method can be applied to currently captured sensor data to secure the sensor data and herewith the processing and decision chain, for example, in the sensor data evaluation during the automated driving of a transportation vehicle. The captured sensor data can then be checked for adversarial perturbations in parallel with a processing by the neural network. Reliability and security in the processing can be increased as a result. Output data inferred by the neural network are then used, for example, for a decision-making, in particular, for the automated driving of the transportation vehicle, and therefore form the basis or one of the bases for the decision-making, for example, for controlling an actuator system of the transportation vehicle.

In at least one exemplary embodiment, it is provided that a confidence value of the input data and/or of a sensor providing the input data is modified depending on the detection result. A confidence value of the input data and/or of the sensor is a measure of the trustworthiness of the input data or of the sensor. If, for example, camera images captured by a camera are evaluated by the neural network, for example, to detect objects in the captured camera images, to estimate a position of the objects (estimation of bounding boxes) or to perform a semantic segmentation, the camera images are checked by the discriminator network before they are fed to the neural network. If the discriminator network detects that the input data (camera images) are adversarially perturbed, a corresponding detection result is generated and the captured camera images are flagged as adversarially perturbed. A lower confidence value than unperturbed input data (camera images) is then assigned to the input data (camera images). In a subsequent further processing of the input data (camera images), a lower confidence value can similarly be assigned to results inferred by the neural network, for example, detected objects. This enables the trustworthiness of the input data and of the results inferred by the neural network to be estimated and to be taken into account in the further processing, for example, in the provision of an environment monitoring and/or an automated driving function.

In at least one exemplary embodiment, it is provided that output data generated by the neural network are evaluated depending on the provided detection result and/or that a confidence value of output data of the neural network is modified or adjusted depending on the detection result and/or the modified confidence value of the input data and/or of the sensor providing the input data, wherein the confidence value is provided in addition to the output data. It is thus possible to take a trustworthiness or confidence of the output data inferred by the neural network into account in a subsequent further processing, for example, in a trajectory planning and/or in the control of an actuator system of a transportation vehicle. As a result, less trustworthy output data can be taken into account less strongly than more trustworthy output data. Depending on the evaluation and/or the confidence value of the output data, it can be decided here, for example, how strongly the output data are taken into account or whether they are completely rejected.

In at least one exemplary embodiment, it is provided that, depending on the detection result, a weighting of output data inferred by the neural network on the basis of the input data is modified in averaged output data and/or in an estimation method operating with the output data. Averaged output data or estimation methods can be provided more reliably as a result. If, for example, an object-tracking function is provided as an estimation function in which a current object position and/or object orientation is estimated on the basis of current input data and previous estimation values for an object position and/or an object orientation and if it turns out, for example, that input data fed to the neural network are adversarially perturbed, the current input data can be given a lower weighting in the estimation of the object position and/or object orientation in favor of the previous estimation values. A weighting can also be taken into account in the subsequent further processing of the output data, for example, in a trajectory and/or maneuver planning and/or in the control of an actuator system.

In at least one exemplary embodiment, it is provided that the conditional generative adversarial network is trained during at least one further training phase for at least one further adversarial perturbation. New adversarial perturbations or types or classes of adversarial perturbations can also be taken into account as a result. The conditional generative adversarial network is then retrained.

In at least one exemplary embodiment, it is provided that the training phase is run on a backend server, wherein the application phase is run on at least one detection device separate from the backend server. The discriminator network can thus be used independently from the training phase. Conversely, the training phase can be performed centrally on a powerful backend server.

In principle, however, it is also possible to carry out the method entirely on a single computing device (with an associated storage device). This can be done, for example, for simulation and/or testing.

In at least one exemplary embodiment, it is provided that the adversarially perturbed input data generated by the trained generator network are used to test at least one defense strategy against adversarial perturbances and/or to test an adapted neural network. A benchmark can thereby be provided, on the basis of which defense strategies against adversarial perturbations can be tested and improved. A defense strategy here can comprise, for example, a method for training the neural network or for modifying a structure of the neural network so that the neural network becomes more resilient to the adversarially perturbed input data. The trained generator network can be provided in such a way that it can be used for testing at different locations and/or in different application scenarios. It is provided, for example, as a digital packet distinctly describing a structure, weightings and parameters of the trained generator network.

A method for detecting an adversarial perturbation in input data of a neural network is further provided, wherein a trained discriminator network is used to detect an adversarial perturbation in input data of the neural network and to provide a detection result, wherein the discriminator network has been trained in a training phase by a method according to one of the described embodiments.

A system is furthermore also provided, comprising a backend server according to any of the described embodiments and at least one detection device according to any of the described embodiments. The backend server and the at least one detection device comprise communication interfaces via which a trained discriminator network can be transmitted from the backend server to the at least one detection device.

Features for the design of the backend server and/or the detection device can be found in the description of designs of the method. The benefits of the backend server and/or the detection device are in each case the same here as for the designs of the method.

A transportation vehicle is furthermore also provided, comprising at least one detection device according to one of the described embodiments.

A computer program is also provided, comprising commands which, during the execution of the computer program by a computer, cause the computer to carry out the method operations of the training phase and/or the application phase of the disclosed method.

In addition, a data carrier signal is also provided which transmits a computer program of this type.

FIG. 1 shows a schematic view of disclosed embodiments of the backend server 2 and the detection device 3. The detection device 3 is implemented, for example, in a transportation vehicle 50 where it serves to check the input data 10 of a neural network 30 (indicated schematically only) which performs a recognition function for environment monitoring (e.g., object detection, estimation of a bounding box of objects and/or performance of a semantic segmentation). The backend server 2 and the detection device 3 form a system 1.

The backend server 2 comprises a computing device 4, a storage device 5 and a communication interface 6. The computing device 4 can perform computing operations in the storage device 5. The computing device 4 is designed in such a way as to provide and train a conditional generative adversarial network 20, wherein a generator network 21 of the conditional generative adversarial network 20 is trained to generate adversarial perturbations conditioned on input data 10 of the neural network 30, and further to train a discriminator network 22 of the conditional generative adversarial network 20 at least to detect an adversarial perturbation in the input data generated by the generator network 21. The computing device 4 performs the computing operations necessary to carry out the training phase and to provide the generative adversarial network 20.

Input data 40 which are adversarially perturbed, in particular, by known adversarial perturbations, and which are stored in the storage device 5 are used to train the generator network 21. If the input data 10 are camera images, known software toolboxes, for example, such as, for example, the IBM Adversarial Robustness Toolbox, CleverHans or FoolBox, can be used to generate the adversarially perturbed input data 40 used in the training. Unperturbed camera images can be provided with adversarial perturbations in a targeted manner with these toolboxes.

The trained discriminator network 22 is provided by the backend server 2 on completion of the training phase. This is done via a communication interface 6 of the backend server 2 which forwards the discriminator network 22 to the detection device 3 as a digital data packet which distinctly describes a structure, weightings and other parameters of the discriminator network 22.

The detection device 3 comprises a computing device 11, a storage device 12 and a communication interface 13. The computing device 3 is designed in such a way as to receive the trained discriminator network 22 forwarded by the backend server 2 as a digital packet via the communication interface 13 and to use the trained discriminator network 22 during an application phase to detect an adversarial perturbation in input data 10 of the neural network 30 and to provide a detection result 14. The input data 10 are fed to the computing device 11 for this purpose. The input data 10 are captured sensor data from at least one sensor, for example, camera images of an environment of the transportation vehicle 50 captured by a camera 51 of the transportation vehicle 50. For the detection, the computing device 11 performs the necessary computing operations to provide and implement the discriminator network 22. The input data 10 are fed to inputs of the discriminator network 22. The discriminator network 22 then infers the detection result 14 (e.g., input data 10 adversarially perturbed: "yes" or "no").

The detection result 14 is provided and output, for example, as a detection result signal 15, for example, as a digital data packet. The detection result 14 comprises information indicating whether the input data 10, i.e., the captured sensor data, are or are not perturbed.

It is provided that the captured sensor data from at least one sensor, for example, the camera 51, are fed as input data 10 to the neural network 30 during the application phase 200 and output data 16 are generated and provided from the input data 10 by the neural network 30. The generated or inferred output data 16 are then further used in a trajectory planning or maneuver planning and/or for controlling an actuator system of the transportation vehicle 50.

It is therefore provided that the neural network 30 provides a function for the automated driving of the transportation vehicle and/or for a driver assistance of the transportation vehicle and/or for an environment monitoring and/or environment recognition. Examples of this are a semantic segmentation and/or an object detection in sensor data, in particular, in captured camera images.

The detection device 3 enables an improved detection of adversarial perturbations in input data 10 of the neural network 30. Output data 16 inferred by the neural network 30 on the basis of the input data 10 can hereby be evaluated in terms of trustworthiness.

It can be provided that a confidence value of the input data 10 and/or of a sensor, e.g., the camera 51, providing the input data 10 is modified depending on the detection result 14.

It can further be provided that output data 16 generated by the neural network 30 are evaluated depending on the provided detection result 14 and/or that a confidence value of output data 16 of the neural network 30 is modified or adjusted depending on the detection result 14 and/or the modified confidence value of the input data 10 and/or of the sensor 51 providing the input data 10, wherein the confidence value is provided in addition to the output data 16. An evaluation result and/or a confidence value of the output data 16 can be taken into account in a subsequent further processing, for example, in a trajectory planning or maneuver planning and/or in the control of an actuator system. Depending on the evaluation and/or the confidence value of the output data 16, it can be decided here how strongly the output data 16 are taken into account or whether they are completely rejected, i.e., are not taken into account in the subsequent further processing.

It can be provided that, depending on the detection result 14, a weighting of output data 16 inferred by the neural network 30 on the basis of the input data 10 is modified in averaged output data and/or in an estimation method operating with the output data 16.

It can be provided that the conditional generative adversarial network 20 is trained during at least one further training phase for at least one further adversarial perturbation.

It can be provided that the adversarially perturbed input data 10 generated by the trained generator network 21 are used to test at least one defense strategy against adversarial perturbances and/or to test an adapted neural network.

Figure 2:
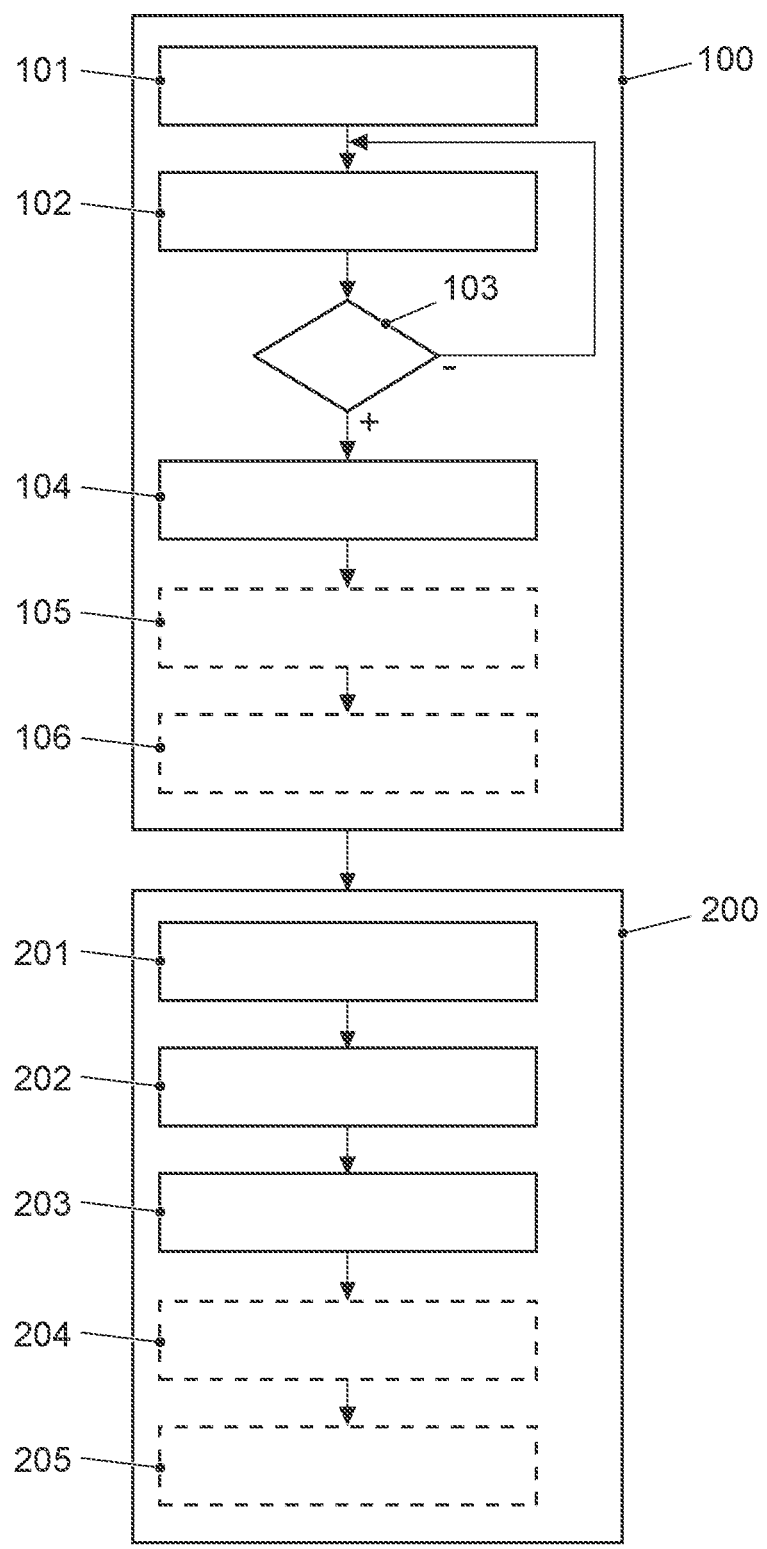
FIG. 2 shows a schematic flow diagram of an exemplary embodiment of the method for detecting an adversarial perturbation in input data of a neural network.

FIG. 2 shows a schematic flow diagram of an exemplary embodiment of the method for detecting an adversarial perturbation in input data of a neural network.

The method comprises a training phase 100 and an application phase 200.

During the training phase 100, adversarially perturbed input data are generated as training data in a method operation at 101. This can be done by a computing device of a disclosed backend server or also by a different computing device. If the input data are camera images, known software toolboxes, such as, for example, the IBM Adversarial Robustness Toolbox, CleverHans or FoolBox, can be used to generate the adversarially perturbed input data. Unperturbed camera images can be provided with adversarial perturbations in a targeted manner with these toolboxes. The input data generated in this way are then used as training data to train a generator network of a conditional generative adversarial network.

The conditional generative adversarial network is trained in a method operation at 102. The generator network of the conditional generative adversarial network is trained here to generate adversarial perturbations conditioned on input data of the neural network. A discriminator network of the conditional generative adversarial network is trained to detect an adversarial perturbation in the input data generated by the generator network.

In a method operation at 103, a check is carried out to determine whether a functional quality of the generator network and of the discriminator network has been achieved. A check is carried out to determine whether a state of equilibrium is achieved in which the discriminator network correctly classifies adversarially perturbed input data provided by the generator network with a probability of 50%. If not, the conditional generative adversarial network is further trained.

If a sufficient functional quality is achieved, the trained discriminator network of the conditional generative adversarial network is provided in a method operation at 104. The trained discriminator network is forwarded for this purpose, in particular, as a digital packet comprising a structure, weightings and parameters of the trained discriminator network, to a detection device which is used, for example, to detect adversarial perturbations in a transportation vehicle.

In the application phase 200, the provided trained discriminator network is received and provided by the detection device in a method operation at 201.

In a method operation at 202, the trained discriminator network is applied to input data of a neural network which performs, for example, an object detection. The input data are, for example, current captured sensor data from at least one sensor, in particular, camera data from a camera monitoring an environment. The trained discriminator network detects whether the input data are or are not adversarially perturbed. To do this, the trained discriminator network infers a detection result on the basis of the fed input data.

In a method operation at 203, the detection result is provided, in particular output, for example, as a detection result signal, in particular, as a digital data packet.

In a method operation at 204, it can be provided that a confidence value of the input data and/or of a sensor providing the input data is modified depending on the detection result.

In method operation at 204, it can alternatively or additionally be provided that output data 16 generated by the neural network 30 are evaluated depending on the provided detection result 14 and/or that a confidence value of output data 16 of the neural network 30 is modified or adjusted depending on the detection result 14 and/or the modified confidence value of the input data 10 and/or of the sensor 51 providing the input data 10, wherein the confidence value is provided in addition to the output data 16.

In method operation at 205, it can be provided that, depending on the detection result, a weighting of output data inferred by the neural network on the basis of the input data is modified in averaged output data and/or in an estimation method operating with the output data.

In a method operation at 105, it can be provided that the conditional generative adversarial network is trained during at least one further training phase for at least one further adversarial perturbation.

In a method operation at 106, it can be provided that the adversarially perturbed input data generated by the trained generator network are used to test at least one defense strategy against adversarial perturbances and/or to test an adapted neural network.

If a trained discriminator network is already present, i.e., a discriminator network trained according to the training phase 100 is provided, the method can also comprise only the method operations at 201-205 of the application phase 200.

The method offers the benefits that the detection of adversarial perturbations can be improved. The detection and prevention of adversarial attacks can be improved as a result.

REFERENCE NUMBER LIST

1 System
2 Backend server
3 Detection device
4 Computing device (backend server)
5 Storage device (backend server)
6 Communication interface (backend server)
10 Input data
11 Computing device (detection device)
12 Storage device (detection device)
13 Communication interface (detection device)
14 Detection result
15 Detection result signal
16 Output data
20 Conditional generative adversarial network
21 Generator network
22 Discriminator network
30 Neural network
40 Adversarially perturbed input data (training data)
50 Transportation vehicle
51 Camera
100 Training phase
100-106 Method operations
200 Application phase
201-205 Method operations

The invention claimed is:

1. A backend server configured to train a conditional generative adversarial network for use with a neural network for use in automated or assisted transportation vehicle operation, the backend server comprising:
a computing device; and
a computer storage device including instructions for computing operations to be performed by the computing device,
wherein the computing device provides and trains the conditional generative adversarial network during a training phase,
wherein the conditional generative adversarial network includes a generator network and a discriminator network,
wherein during training of the conditional generative adversarial network during the training phase, the computing device trains the generator network to generate adversarial perturbations based on data captured by a transportation vehicle sensor used in automated or assisted transportation vehicle operation, and wherein, during the training phase, the computing device produces a trained discriminator network by training the discriminator network to detect an adversarial perturbation in the data generated by the generator network and to output a detection result indicating whether the data generated by the generator network is adversarially perturbed, whereby, during an application phase, output results inferred by the neural network based on the data input to the neural network are used to evaluate at least one of a confidence level for sensor data generated by the transportation vehicle sensor or a confidence level for the transportation vehicle sensor generating the sensor data for use in the automated or assisted transportation vehicle operation, wherein data are checked by the trained discriminator network before being input to the neural network such that, in response to the discriminator network detecting that the data to be input to the neural network are adversarially perturbed, the generated detection result indicates the data to be input is adversarially perturbed, the data to be input are flagged as adversarially perturbed and a corresponding confidence value lower than a confidence value for unperturbed data is assigned to the data to be input for use in subsequent further processing and is also assigned to output results inferred by the neural network based on the flagged data for use in the provision of an environment monitoring and/or an automated driving function for the transportation vehicle.

2. A detection device for detecting adversarial perturbations in input data of a neural network for use in automated or assisted transportation vehicle operation, the detection device comprising:

a computing device; and a computer storage device including instructions for computing operations to be performed by the computing device, wherein, during operation of the detection device in an application phase, the computing device:

provides a trained discriminator network that is produced by a training phase in which a discriminator network of a conditional generative adversarial network is trained to detect an adversarial perturbation based on data generated by a generator network of the conditional generative adversarial network, wherein, during the training phase, the input data is training data that is adversarially perturbed data generated for a transportation vehicle sensor used in automated or assisted transportation vehicle operation;

detects an adversarial perturbation in input data of the neural network during operation in a subsequent application phase and outputs a detection result indicating whether the data generated by the generator network is adversarially perturbed, whereby, during the application phase, output results inferred by the neural network based on the data input to the neural network are used to evaluate at least one of a confidence level for sensor data generated by the transportation vehicle sensor or a confidence level for the transportation vehicle sensor generating the sensor data for use in the automated or assisted transportation vehicle operation, wherein the data are checked by the trained discriminator network before being input to the neural network such that, in response to the discriminator network detecting that the data to be input to the neural network are adversarially perturbed, the generated detection result indicates the data to be input is adversarially perturbed, the data to be input are flagged as adversarially perturbed and a corresponding confidence value lower than a confidence value for unperturbed data is assigned to the data to be input for use in subsequent further processing and is also assigned to output results inferred by the neural network based on the flagged data for use in the provision of an environment monitoring and/or an automated driving function for the transportation vehicle.

3. A system for detecting an adversarial perturbation in input data of a neural network for use in automated or assisted transportation vehicle operation, the system comprising:

a backend server configured to train a conditional generative adversarial network for use with the neural network for use in automated or assisted transportation vehicle operation, the backend server including a computing device and a computer storage device including instructions for computing operations to be performed by the computing device, wherein the computing device provides and trains a conditional generative adversarial network during a training phase, wherein the conditional generative adversarial network includes a generator network and a discriminator network, wherein during training of the conditional generative adversarial network during the training phase, the computing device trains the generator network to generate adversarial perturbations based on input data of the neural network during operation in a subsequent application phase, wherein, during the training phase, the computing device produces a trained discriminator network by training the discriminator network to detect an adversarial perturbation in input data generated by the generator network; and at least one detection device of claim 2.

4. A transportation vehicle comprising at least one detection device of claim 2.

5. A non-transitory computer readable medium including a computer program comprising commands which, during the execution of the computer program by a computer, cause the computer to provide the functionality of the computing device of claim 1.

6. A method for detecting an adversarial perturbation in input data of a neural network and outputting a detection result for use in automated or assisted transportation vehicle operation, the method comprising:

providing and training a conditional generative adversarial network during a training phase using a backend server that includes a computing device and a computer storage device including instructions for computing operations to be performed by the computing device, wherein the conditional generative adversarial network includes a generator network and a discriminator network, wherein during training of the conditional generative adversarial network during the training phase, the computing device trains the generator network to generate adversarial perturbations based on data captured by a transportation vehicle sensor used in automated or assisted transportation vehicle operation, wherein, during the training phase, the computing device produces a trained discriminator network by training the discriminator network to detect an adversarial perturbation in input data generated by the generator network and to output a detection result indicating whether the data generated by the generator network is adversarially perturbed, whereby, during an application phase, output results inferred by the neural network based on the data input to the neural network are used to evaluate at least one of a confidence level for sensor data generated by the transportation vehicle sensor or a confidence level for the transportation vehicle sensor generating the sensor data for use in the automated or assisted transportation vehicle operation, wherein data are checked by the trained discriminator network before being input to the neural network such that, in response to the discriminator network detecting that the data to be input to the neural network are adversarially perturbed, the generated detection result indicates the data to be input is adversarially perturbed, the data to be input are flagged as adversarially perturbed and a corresponding confidence value lower than a confidence value for unperturbed data is assigned to the data to be input for use in subsequent further processing and is also assigned to output results inferred by the neural network based on the flagged data for use in the provision of an environment monitoring and/or an automated driving function for the transportation vehicle.

7. The method of claim 6, further comprising:
inputting sensor data from at least one transportation vehicle sensor captured during the application phase as the input data to the neural network; and
generating and providing output data by the neural network based on the input data.

8. The method of claim 6, further comprising, based on the detection result, modifying a confidence value of the input data and/or modifying a confidence level of a sensor providing the input data.

9. The method of claim 6, further comprising:
evaluating output data generated by the neural network based on the detection result; and/or
modifying a confidence value of output data of the neural network based on the detection result and/or the modified confidence value of the input data and/or of the sensor providing the input data,
wherein the confidence value is output in addition to the output data.

10. The method of claim 6, further comprising modifying a weighting of output data inferred by the neural network based on the input data based on the detected result, wherein the modified weighting of output data in averaged output data and/or an estimation operation using the output data.

11. The method of claim 6, further comprising training the conditional generative adversarial network during at least one further training phase for at least one further adversarial perturbation.

12. The method of claim 6, wherein the training phase is conducted using the backend server and the application phase is conducted using at least one detection device separate from the backend server.

13. The method of claim 6, further comprising using the adversarially perturbed input data generated by the trained generator network to test at least one defense strategy against adversarial perturbances and/or to test an adapted neural network.

14. The method of claim 6, wherein the neural network further provides a function for environment monitoring and/or environment recognition.

15. The method of claim 6, further comprising:
detecting an adversarial perturbation in input data of the neural network using the trained discriminator network; and outputting a detection result.

16. The system of claim 1, wherein sensor data from at least one transportation vehicle sensor captured during the application phase is input as the input data to the neural network, and output data are generated and provided by the neural network based on the input data.

17. The system of claim 1, wherein, based on the detection result, a confidence value of the input data is modified and/or a confidence level of a sensor providing the input data is modified.

18. The system of claim 1, wherein output data generated by the neural network are evaluated based on the detection result, and/or a confidence value of output data of the neural network is modified based on the detection result and/or the modified confidence value of the input data and/or of the sensor providing the input data, wherein the confidence value is output in addition to the output data.

19. The system of claim 1, wherein, a weighting of output data inferred by the neural network based on the input data is modified based on the detected result, wherein the modified weighting of output data in averaged output data and/or an estimation operation using the output data.

20. The system of claim 1, wherein the conditional generative adversarial network is trained during at least one further training phase for at least one further adversarial perturbation.

21. The system of claim 1, wherein the training phase is conducted using the backend server and the application phase is conducted using at least one detection device separate from the backend server.

22. The system of claim 1, wherein the adversarially perturbed input data generated by the trained generator network are used to test at least one defense strategy against adversarial perturbances and/or to test an adapted neural network.

23. The system of claim 1, wherein the neural network further provides a function for environment monitoring and/or environment recognition.

* * * * *